United States Patent [19]

Rogalla et al.

[11] Patent Number: 5,327,861
[45] Date of Patent: Jul. 12, 1994

[54] AUTOMATIC OIL ADDITIVE INJECTOR

[75] Inventors: Ronald J. Rogalla; Arnold J. Chesna, both of Melrose Park; James J. Grinsteiner, Union; Bronislaw B. Florek, Elk Grove Village, all of Ill.

[73] Assignee: Navistar International Transportation Corp., Chicago, Ill.

[21] Appl. No.: 97,421

[22] Filed: Jul. 26, 1993

[51] Int. Cl.⁵ .............................................. F01M 9/02
[52] U.S. Cl. ................................ 123/196 S; 184/1.5; 184/6.21; 184/7.4
[58] Field of Search .......... 123/196 R, 196 S, 196 AB; 184/1.5, 6.4, 6.21, 7.4

[56] References Cited

U.S. PATENT DOCUMENTS

| | | | |
|---|---|---|---|
| 2,898,902 | 8/1959 | Vogel | 123/196 S |
| 4,284,245 | 8/1981 | Fishgal | 184/6.21 |
| 4,703,727 | 11/1987 | Cannon | 123/196 S |
| 4,750,456 | 6/1988 | Ladrach | 123/196 S |
| 5,273,134 | 12/1993 | Hegemier et al. | 123/196 S |

FOREIGN PATENT DOCUMENTS 0191458  8/1986  European Pat. Off. ......... 123/196 S Primary Examiner—E. Rollins Cross
Assistant Examiner—Erick Solis
Attorney, Agent, or Firm—Dennis K. Sullivan

[57] ABSTRACT

An automatic oil additive injector is disposed over the drain opening in a bottom wall of an engine oil pan and extends into the oil pan. A side port is provided in a housing of the injector for allowing oil to drain therethrough when the oil drain plug is removed. Primary and secondary valve assemblies and a pump operator provided in the housing are activated upon removal of the drain plug to allow a chamber therebetween to fill with a predefined volume of additive, preferably silicone fluid, from a reservoir of the injector and which, upon engagement of the drain plug, dispense the fluid into the oil pan at each oil change to decrease aeration of the oil. In a second embodiment, the additive injector and reservoir are incorporated in the lubricating oil filter header.

20 Claims, 4 Drawing Sheets

FIG. 2

AUTOMATIC OIL ADDITIVE INJECTOR

BACKGROUND OF THE INVENTION

The present invention pertains to an internal combustion engine having an additive injector for dispensing a predetermined amount of additive into the engine lubricating oil during the periodic replacement thereof during the life of the engine, the additive preferably being silicone fluid which is known to decrease aeration of the oil. In a preferred embodiment, the injector is activated by engagement of an oil pan drain plug therewith to cause a predefined volume of silicone fluid to be transferred from a reservoir of the injector to the oil pan when the drain plug is reinserted during each oil change. In a second embodiment, the injector is incorporated in the oil filter header and releases the predetermined volume when the filter element is changed.

THE PRIOR ART

Aeration of lubricating oils, or the entrainment of gas bubbles within the oil, has been a technical problem for as long as oils have been used in rotating equipment, especially for internal combustion engines. High oil aeration causes increasingly poorer engine lubrication system performance as temperatures increase and pressures drop. High oil aeration also reduces the bulk modulus or stiffness of the oil and can cause performance problems with hydraulic valve trains.

When lubricating oil is used in a diesel engine as a high pressure hydraulic fluid for operating fuel injectors, such as described in Ausman et al Pat. No 5,121,730, oil aeration causes additional concern. High oil aeration levels cause a reduction in fuel delivery and a delay in fuel injection, compared to performance with low oil aeration. Therefore, it is desirable to maintain low levels of oil aeration during all operating conditions.

It is known that silicone fluid can be used as an additive in oil to reduce the foaming or aeration tendency to acceptable levels. Because the concentrations required are very low, ranging from 7 to 14 ppm, the total volume of silicone additive which would be required to treat all of the engine oil used for the life of the engine would be very small, no more than a few ounces, depending upon the dilution ratio of the silicone fluid used, estimated engine life, and oil change intervals.

SUMMARY OF THE INVENTION

In the present invention, the aeration problem is solved by carrying a small quantity of silicone fluid on-board the engine and dispensing it automatically in measured volumes during the life of the engine, preferably without operator intervention, each time that the oil is changed.

Accordingly, it is a primary object of the invention described and claimed herein to provide an internal combustion engine with an automatic lubricating oil additive injector which will dispense a quantity of additive when the oil is changed.

It is an object of the invention to provide an injector having an onboard additive supply of sufficient quantity to provide additive during a plurality of oil changes, preferably at each oil change throughout the useful life of the engine.

A further object of the invention is that the injector be automatically activated upon oil change.

A more specific object of the invention to dispense a predetermined volume of additive to engine oil at each oil change.

These and other objects are specifically met by an internal combustion engine having an automatic oil additive injector having a small reservoir containing a lubricating oil additive to be dispensed, silicone fluid in this case. A pumping apparatus, including check valves and a pumping member which is supported by the oil pan drain plug, when installed, delivers the additive from the reservoir to the lubricating oil during the process of removing and installing an oil pan drain plug at an oil change. When the drain plug is removed, the automatic oil additive injector draws in a measured volume of additive from the reservoir to a charge volume in the injector. Then, when the drain plug is installed, the injector dispenses this volume of fluid into the oil within the oil pan. Once the engine is started, this additive is mixed with the fresh oil. The reservoir is provided during manufacture with a quantity of additive sufficient to dispense the desired volume many times corresponding to a predetermined number of oil changes during the useful life of the engine. In a second embodiment, the pumping apparatus and reservoir are incorporated in the lubricating oil filter header and the pumping member is operated by the removal and replacement of the filter element which is preferably changed at each oil change.

BRIEF DESCRIPTION OF THE DRAWINGS

Other objects and advantages of the invention will become more apparent upon perusal of the detailed description thereof and upon inspection of the drawings in which:

FIG. 2 is an enlarged cross-section of an alternative embodiment of the injector showing the position of a valve thereof when the drain plug is engaged;

DESCRIPTION OF TEE PREFERRED EMBODIMENT

Figure 1:
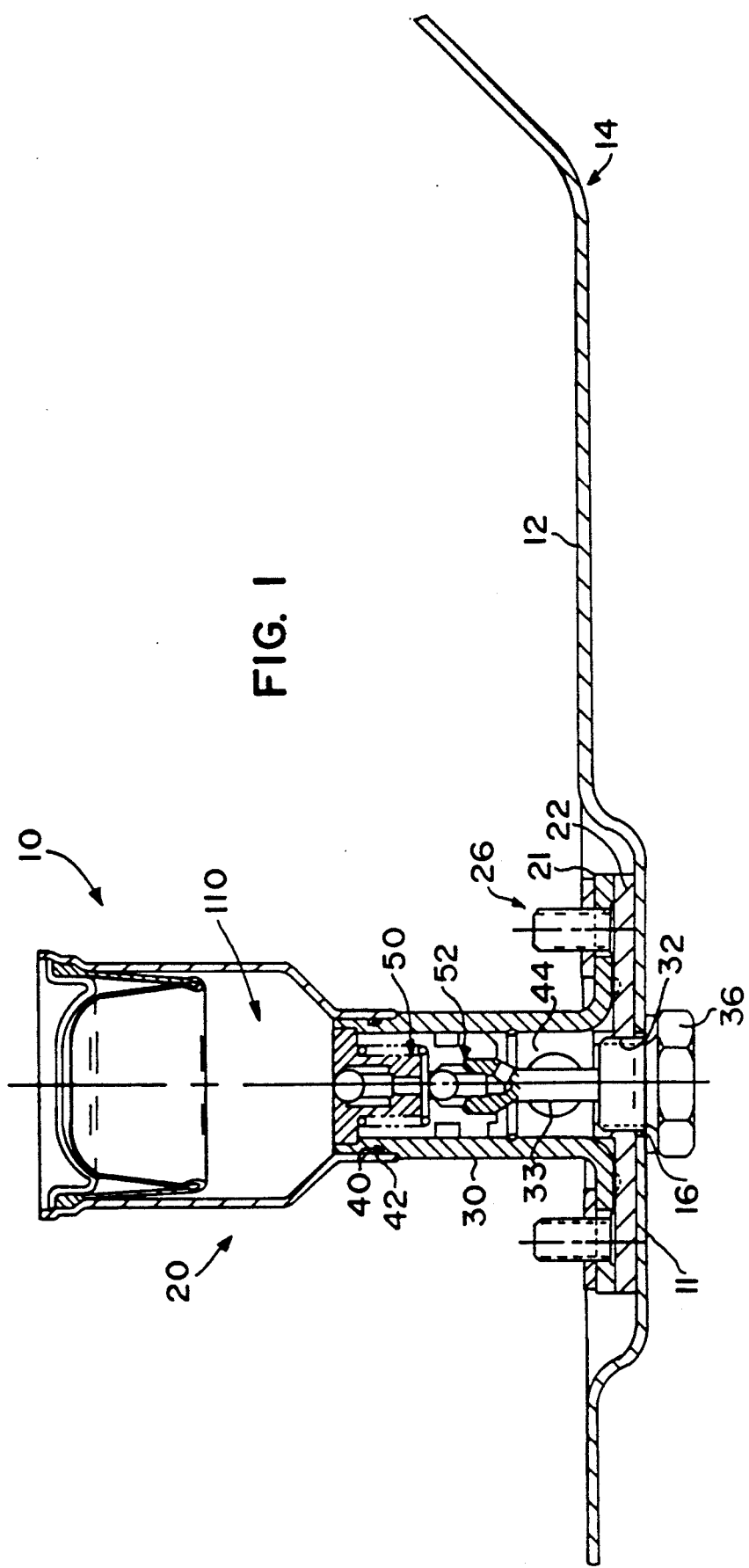
FIG. 1 is a cross-section through an oil pan of an internal combustion engine illustrating the automatic oil additive injector of the present invention.

Referring now to the drawings in greater detail, there is illustrated therein the automatic oil additive injector made in accordance with the teachings of the present invention and generally identified by the reference numeral 10.

As shown, the injector 10 is mounted to the bottom wall 11 of an oil pan 12 within an internal combustion engine 14, a diesel engine in this case, over a port 16 created in the oil pan.

The injector 10 includes an upright, substantially cylindrical canister or housing 20 having a peripheral bottom flange 21 by means of which the housing 20 is engaged as by a plurality of studs 26 to a stiffening flange 22 sealingly attached to the bottom wall 11 of the engine oil pan 12. Optionally, as shown in FIGS. 2 and 3, an exterior lower portion 28 of the housing 20 may be threaded and a threaded engagement created between the injection 10 and the bottom wall 11 or flange 22 of the oil pan 12.

The canister or housing 20 engages a primary valve body 30 which includes a threaded port 32 extending upwardly thereinto from a bottom surface 34 thereof within which a drain plug or bolt 36 is threadedly engaged. The canister or housing 20 is engaged over the valve body 30 either by a threaded engagement or by formation of a crimp joint therebetween. To prevent leakage in the area of the joint, the outer periphery of the valve body 30 is provided with a circumferential groove 40 within which an O-ring 42 is placed, creating a fluid tight seal between the housing 20 and the valve body 30.

A radial throughbore 44 is provided at the lower end of the valve body 30, an inner end 46 of which communicates with the bore 48 of the valve body and with the threaded port 32. Thus, when the drain plug 36 is removed, oil is drained from the oil pan 12 and engine 14 through the throughbore 44 and the threaded port 32. Within the bore 48 of the valve body 30 are positioned a primary valve assembly 50 and a secondary valve assembly 52 of the injector 10. In this respect, the drain plug 36 is provided with a cylindrical projection 33 extending from the threaded end thereof into the bore 48 of the valve body to engage the lower portion of the secondary valve 52. It will be appreciated that the cylindrical projection could be provided on the valve 52 rather than the plug 36 so long as it does not interfere with the flow of oil or fluid through throughbore 44.

Figure 2:
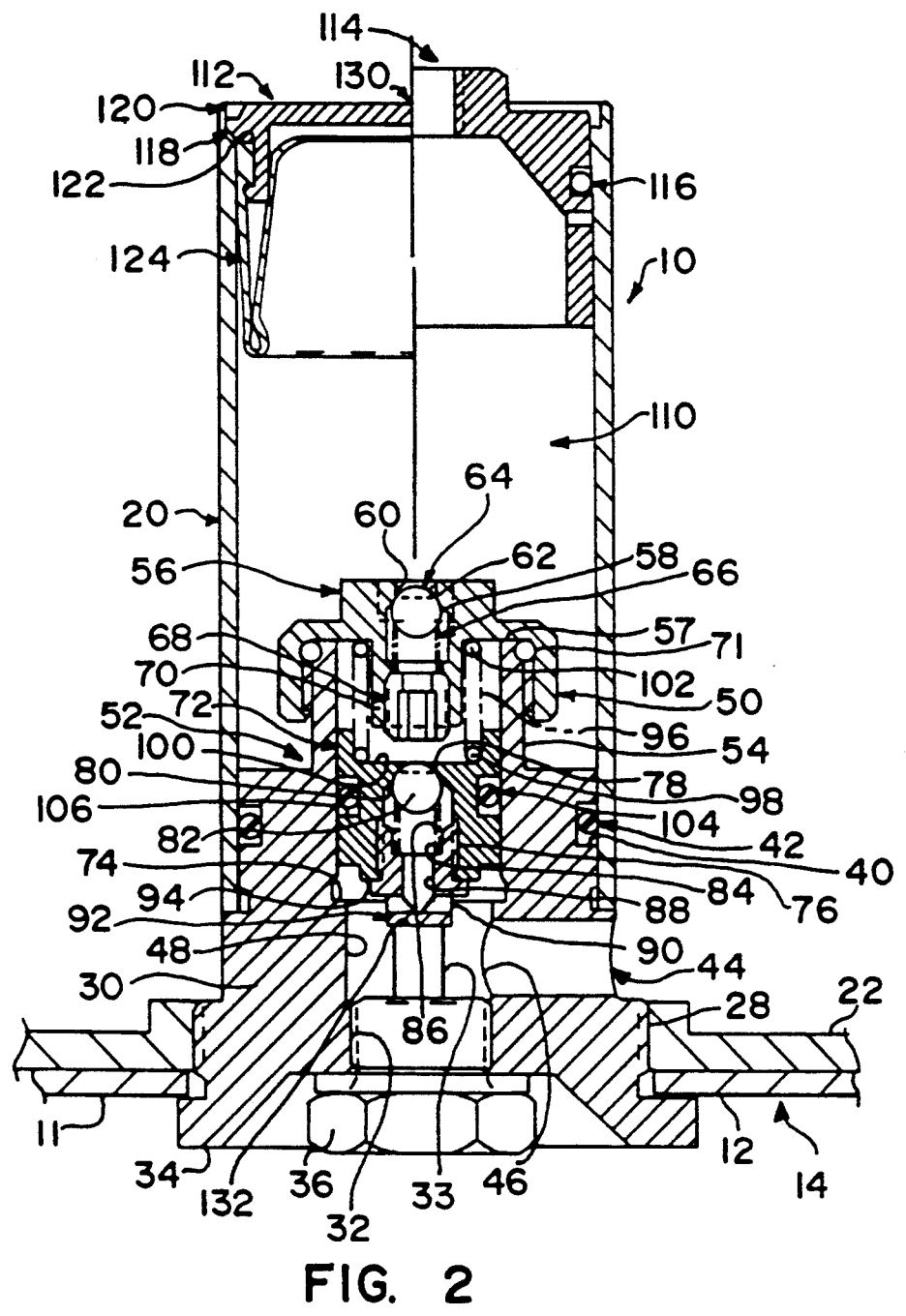
Figure 3:
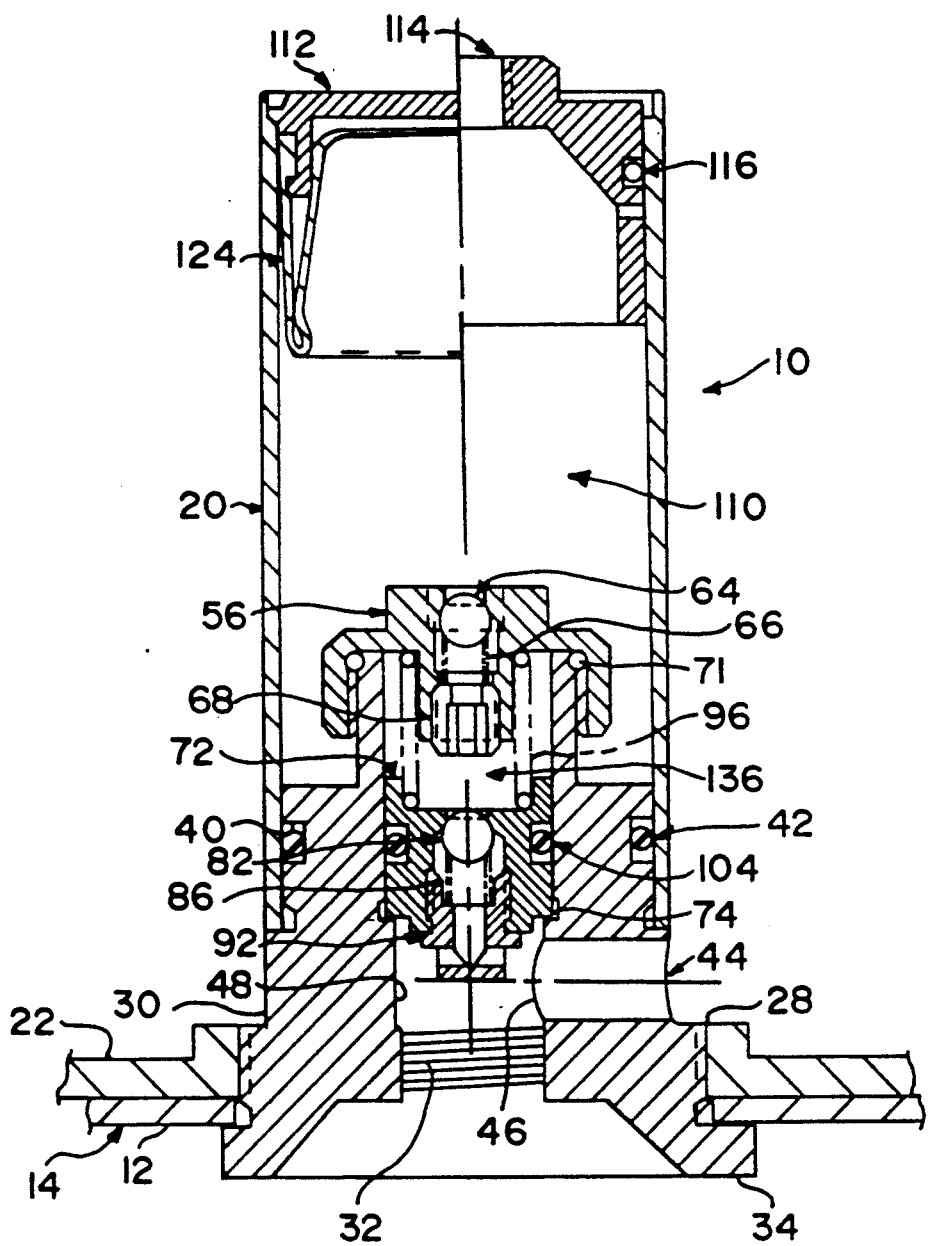
FIG. 3 is an enlarged cross-section identical to FIG. 2 except showing the position of the valve when the drain plug is disengaged.

As shown in FIGS. 2 and 3, the primary valve assembly 50 is elevated above the body 30 by a centered cylindrical projection 54 and includes a cap member 56 which engages over an upper end 57 of the projection 54 and forms a seat 58 for the primary valve assembly 50 of the injector 10. The cap member 56 has a central orifice 60 therein defined by a radially inwardly extending shoulder 62 against which a ball 64, preferably made of fluorocarbon material, is biased by spring 66 which rests atop a cylindrical spring seat element 68 having an open central portion which threadedly engages a downwardly extending cylindrical projection 70 of the cap member 56 within the valve body projection 54. To prevent leakage between the cap 56 and the projection 54, an O-ring seal 71 is provided therebetween as shown.

Seated within the bore 48 of the valve body 30 below the primary valve assembly 50 is the secondary valve assembly 52 which includes a valve body 72 which is slidable within the bore 48 to a lowermost position where it rests on an inwardly extending shoulder 74 created within the valve body 30 as shown in FIG. 3. The secondary valve body 72 also has a center orifice 76 therein which is defined by an inwardly directed shoulder 78 which forms a seat 80 against which an upwardly biased ball 82 rests. Beneath this ball 82 is a second spring seat member 84 upon which a biasing spring 86 for maintaining the ball 82 seated rests. This spring seat member 84 is threadedly engaged to the valve body 72 and has a center orifice 88 which feeds a plurality of radial passages 90 in a lower collar section 92 thereof which depends below an inner bottom edge 94 of the valve body 72 whereat it is engaged by the projection 33 of the installed drain plug 36. The slidable valve body 72 thus is a pumping member which is operated by the drain plug 36 and is biased toward its lowermost position by a spring 96 disposed between the valve body projection 54 and the valve cap projection 70. A lower end 98 of the biassing spring 96 engages an upper surface 100 of the secondary valve body 72 and an upper end 102 thereof engages the cap member 56. To prevent leakage in the area between the valve body 72 and the primary valve body 30 an O-ring seal 104 is provided therebetween as shown, the O-ring seal 104 seating within a peripheral groove 106 provided in valve body 72.

An upper area 110 within the housing 20 is hollow, creating a reservoir 110 therein within which a predetermined amount of oil additive is stored corresponding to a predetermined number of additive doses to cover the useful life of the engine, or until the engine is overhauled. Due to a slow depletion of the additive, it is preferred to provide a top cover 112 for the reservoir 110 which will follow the fluid surface downwardly and is vented to prevent creation of a vacuum within the reservoir 110.

Such fluid following cover 112 may be realized in several ways, two of which are shown in the disclosed embodiment of FIGS. 2 and 3. First, a slidable cover member 114 as shown to the right in FIGS. 2 and 3 may be provided, with the cover member 114 floating downwardly on the surface of the fluid. Such floating cover member 114 would preferably incorporate an O-ring seal 116 about a periphery thereof to keep excess additive from seeping out into the oil surrounding the injector 10.

A second embodiment of the cover 112 is shown on the left in FIGS. 1-3. Here, a solid cover member 118 is joined to the housing 20 by crimping at 120. Depending into the reservoir 110 from peripheral edges 122 of the cover member 118 is a flexible diaphragm 124 which floats on the surface of the additive and is dimensioned to extend downwardly into the reservoir 110 until it nearly rests upon the cap member 56. In order to prevent a vacuum between the diaphragm 124 and the cover member 118, the cover member 118 is vented at 130.

As previously stated, the automatic oil additive injector 10 is desired to deliver a metered dose of additive into a fresh supply of engine oil upon each vehicle oil change. To provide this automatic operation, the injector 10 has been designed to operate upon re-engagement of the drain plug 36 after an oil change.

In this respect, when the drain plug 36 is removed to drain old oil from the oil pan 14, contact between tip 132 of the cylindrical projection 33 of drain plug 36 and the collar section 92 of the secondary spring seat member 84 is eliminated. This allows the secondary valve body 72 to drop from a raised position thereof to its lowermost position resting on the shoulder 78. As this valve body 72 drops, a suction is produced in a chamber 136 between the primary and secondary valve assemblies 50 and 52, the chamber 136 enlarging to a predetermined volume as the secondary valve assembly 52 is maintained seated against its seat 74 while the ball 64 of the primary valve assembly 50 is pulled downwardly against the force of the biasing spring 66 opening the central orifice 60 in the cap member 56.

As the ball 64 of the primary valve assembly 50 is unseated, the oil additive fluid in the reservoir 110 is sucked around the ball 64, filling the chamber 136 between the primary and secondary valve assemblies 50 and 52.

Then, when the drain plug 36 is reinserted, the tip 132 of the projection 33 comes into contact with the spring seat member 84 of the secondary valve assembly 52, forcing the assembly 52 upwardly as the drain plug 36 is screwed tight.

As the assembly 52 is moved upwardly, the ball 64 of the primary valve assembly 50 is hydraulically seated against its seat 62. As the fluid pressure builds up in the chamber 136, the effect causes the ball 82 of the secondary valve assembly 52 to unseat, allowing the dose of fluid in the chamber 136 to escape therearound, into the center orifice 88 of the spring seat 84 and to exit through the radial passages 90 therein, into the throughbore 44 and into the oil pan 12. Simultaneously, the chamber 136 contracts until the next oil change.

As stated above, a very nominal volume of additive is needed to keep the aeration level of the oil low, thereby permitting a nominally sized injector 10 which can easily be seated within the oil pan 12. It has been found that the additive volume should be on the order of 7 parts per million, such volume being somewhere in the range of 0.26 ml. per injection for one particular engine, so the size of reservoir for an engine can be easily calculated from the engine oil capacity. To provide a reservoir 110 having a capacity to accommodate injection over the life of that engine, it is contemplated to provide a 22 ml. volume to the reservoir 110, with such calculation being based on oil changes being performed for every 2000 miles of travel.

THE EMBODIMENT OF FIGS. 4 AND 5

Figure 4:
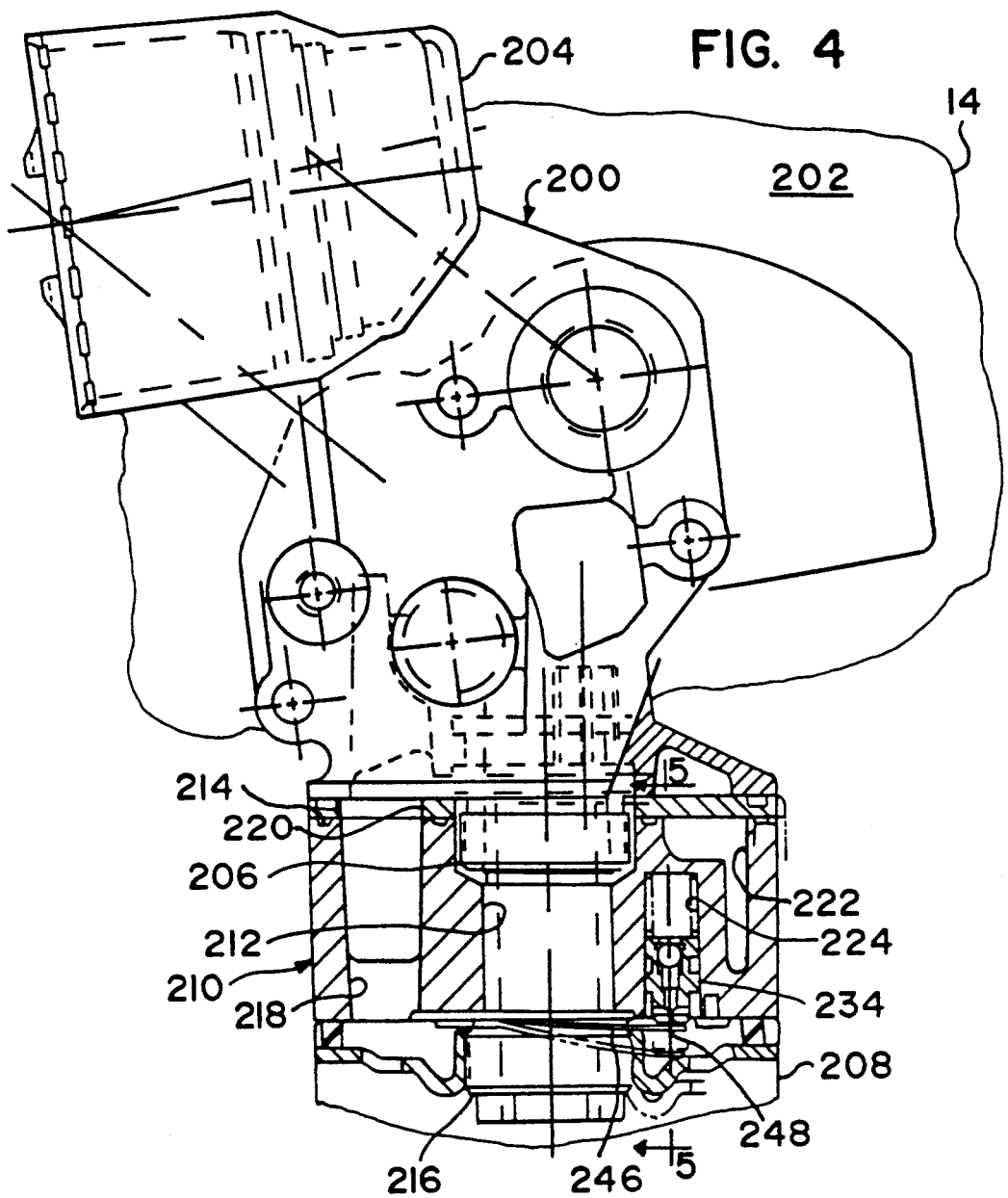
FIG. 4 is a side view partly in section of a second embodiment of the invention wherein the automatic oil additive injector of the present invention is incorporated in a lubricating oil filter header, a portion of a filter element being illustrated in phantom lines to illustrate the movement thereof.
Figure 5:
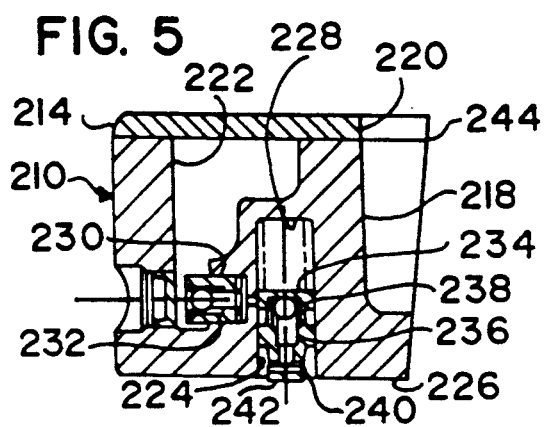
FIG. 5 is a cross-section of the filter header of FIG. 4 taken along the line 5—5 thereof.

The automatic oil additive injector of the invention could also be incorporated in the lubricating oil filter assembly of the engine 14. As shown in FIGS. 4 and 5, a conventional lubricating oil filter header 200 is bolted to the side of the block shown partially at 202 of engine 14. The conventional portion of the header 200 includes an oil cooler interface portion 204, which functions as the header oil inlet, a threaded filter mounting spud 206 having a central passage, and internal passages disposed to provide for lubricating oil to be communicated to a spin-on filter, passed through the filter element, and returned through the central passage to the engine in a conventional manner.

In accordance with the invention, an oil additive injector and reservoir assembly 210 is disposed between the oil filter header 200 and the spin-on oil filter 208. The additive injector and reservoir assembly 210 is a right circular cylinder, preferably die cast aluminum, having a threaded central passage 212 extending therethrough which engages the mounting spud 206, a spacer plate 214 being disposed therebetween with suitable sealing means to prevent the escape of fluid therefrom. An integrally cast filter mounting spud 216 is disposed at the lower end of the central passage 212 so that the threaded spin-on filter 208 can be mounted to the lower side of additive injector and reservoir assembly 210 in the same manner as it was previously mounted to the header 200. The additive injector and reservoir assembly 210 further includes a lubricating oil inlet passage 218 extending therethrough to freely communicate oil from the header 200 to the filter element in the filter 208, the spacer plate 214 having a suitable aperture as at 220 to permit such communication.

The additive injector and reservoir assembly 210 is further provided with an additive reservoir 222 cast into the upper portion of the assembly 210 in a manner isolating the reservoir from other passages in the assembly 210, the top of the reservoir being sealed by the spacer plate 214 as shown in FIG. 5. A pumping valve bore 224 extends vertically from the lower side 226 of the additive injector and reservoir assembly 210 adjacent to reservoir 222 to a closed end 228 and a horizontal crossbore 230 interconnects the reservoir 222 with the pumping valve bore 224 intermediate the ends thereof. The crossbore 230 is increased in diameter on the reservoir end thereof to receive a spring-loaded check valve assembly 232 which permits fluid in the reservoir 222 to enter the crossbore 230 and pumping valve bore 224 while preventing flow in the reverse direction.

Within the pumping valve bore 224, there is slidably disposed a pumping valve 234, of substantially the same construction and operation as the secondary valve 72 of the embodiment of FIGS. 1-3, having a central passage 236 incorporating a spring-loaded check valve assembly 238, permitting flow only in the downward direction, which feeds a plurality of radial passages 240 in a lower end portion 242 thereof. A spring 244 in the closed end of the bore 224 biases the pumping valve 234 to its lowermost position 246 shown in phantom lines in FIG. 4, wherein the lower end portion 242 extends below the lower side 226 of the additive injector and reservoir assembly 210. As shown in FIG. 4, a U-shaped leaf spring 246 is attached to the lower side 226 of the additive injector and reservoir assembly 210 in a manner surrounding the central passage 212, the free end 248 thereof contacting the lower end portion 242 of the pumping valve 234 to limit the travel of the pumping valve 234 out of the bore 224 and to provide a broader contact surface for the filter 208 when it is screwed up onto the spud 216. The pumping valve 234 is sized relative to the vertical position of the intersection of the crossbore 230 with the pumping bore 224 so that the 0-ring seal 235 on the pumping valve 234 does not cover the crossbore 230 when the lower end portion 242 is fully retracted within the pumping bore as shown in FIG. 5.

The operation of this second embodiment is substantially the same as the previous embodiment. When the filter 208 is removed from the spud 216 for replacement, as is recommended practice during a periodic oil change for engine 14, the pumping member 234 is biased by spring 244 to its lowermost position restrained by leaf spring 246. As the pumping members moves downwardly or outwardly in the bore 224, it causes a suction to draw additive thereinto from the crossbore 230. When a new filter 208 is screwed onto the spud 216, it engages leaf spring to force the pumping valve 234 back into its bore 224. Since the check valve 232 prevents flow back to the reservoir, the increased pressure causes the additive to flow past the check valve 238 and through the radial passage 240 into the inlet side of filter 208. When the engine is subsequently operated, the additive will then be distributed uniformly in the engine lubricating oil supply.

As described above, the automatic oil additive injector of the present invention provides a number of advantages, some of which have been described above and others of which are inherent in the invention. While the details of the disclosure relate to a presently preferred embodiment and an alternative embodiment, the principles of the invention may be practiced in other embodiments that are equivalent to those described herein. Accordingly, the scope of the invention is only to be limited as necessitated by the accompanying claims.

What is claimed is:

1. In an internal combustion engine of the type having a quantity of lubricating oil contained therewithin, said lubricating oil requiring replacement at periodic oil service intervals, the improvement wherein said engine further comprises an additive injector, said injector being actuable to release an additive dose of predetermined volume to said lubricating oil, said injector having an additive reservoir of a volume sufficiently larger than said dose volume to provide a plurality of doses, and means responsive to a manual activity associated with said oil service intervals for automatically actuating said injector to release said additive dose.

2. The invention according to claim 1 and said plurality of doses corresponding to a quantity of oil service intervals to occur during a predetermined useful life of said engine.

3. The invention according to claim 1, said engine having an oil pan with a drain plug, and said manual activity comprising installing said drain plug in said oil pan.

4. The invention according to claim 3 wherein said injector is mounted within and to said oil pan.

5. The invention according to claim 1 and said reservoir being sealed from said lubricating oil.

6. The invention according to claim 1, said engine having a lubricating oil filter assembly having a removable filter, and said manual activity comprising installing said filter on said oil filter assembly.

7. The invention according to claim 6, said lubricating oil filter assembly having a header assembly incorporating said injector.

8. An automatic oil additive injector for use in injecting a predefined volume of silicone fluid into engine lubricating oil during periodic oil service intervals thereof when an oil service component is installed, the injector comprising:

a housing engaged to said engine having a passage which communicates with said engine lubricating oil, the housing including therein a reservoir of a fluid oil additive, pumping means disposed in said housing comprising a plurality of spring biased valves and a pumping member which coact to allow transfer of a predetermined discrete amount of said additive from said reservoir to said lubricating oil through said passage only upon said pumping member being operated by disengagement and engagement of said oil service component with said engine.

9. An automatic oil additive injector for use in injecting a predetermined volume of additive into an engine oil pan during periodic oil changes, said oil pan having a drain plug, the injector comprising:

a housing engaged to a bottom wall of the oil pan and extending upwardly into the oil pan, the housing further having an additive reservoir, a central bore closed by said drain plug, and a radial channel extending from an intermediate portion of said bore which communicates with the lubricating oil, pumping means disposed in said housing bore including a plurality of spring biased valves and a pumping member having a portion disposed for engagement by said drain plug, the valves and pumping member coacting to transfer said predetermined volume of said additive from said reservoir of the injector upon operation of said pumping member by the disengagement and engagement of said drain plug.

10. The injector of claim 9 and said injector reservoir having a volume of sufficient volume relative to said predetermined volume to provide additive at each oil change throughout a predetermined useful life of said engine.

11. An oil additive injector which automatically dispenses a predetermined volume of the additive into an engine oil pan whenever a drain plug is engaged within a central channel of the injector, the injector including a housing within which an additive reservoir is defined, the reservoir being in communication with the central channel through coacting valve assemblies, the injector including a radial throughbore therein which extends from the central channel and drains into the oil pan, and the valves coacting in a fixed primary and a slidable secondary manner where said primary valve assembly is operated to allow fluid flow therethrough when said secondary valve assembly drops to a lowermost position thereof, upon disengagement of the drain plug a chamber created between the valves filling with fluid and said secondary valve assembly being operated to allow fluid flow therethrough by raising of the valve assembly to an uppermost position thereof upon threaded engagement of the drain plug, an outlet of the secondary valve assembly being in communication with the radial throughbore.

12. The injector of claim 11 wherein said primary and secondary valve assemblies each include a valve ball which is upwardly spring biased against a valve seat, with a spring seat being provided which is bored out to create a center passage therethrough.

13. The injector of claim 12 wherein said primary valve assembly is fixed at an upper end of said central channel.

14. The injector of claim 13 wherein said secondary valve is slidably engaged within said central channel, the channel including an inwardly directed shoulder therein which is above said radial throughbore and limits a downward extent of travel of said secondary valve assembly.

15. The injector of claim 13 wherein said secondary valve assembly spring seat includes a blind center passage therein which communicates with at least one radial passageway therein, the radial passageway being positioned to drain into said central channel.

16. The injector of claim 15 wherein said spring seat of said secondary valve assembly has a planar bottom surface against which a tip of said drain plug abuts to support said valve assembly in the uppermost position thereof when said plug is fully engaged.

17. The injector of claim 16 wherein said housing includes an upper surface which includes means for constantly maintaining floating contact with an upper surface of additive within the reservoir.

18. The injector of claim 11 wherein said housing upper surface is vented to an interior of the oil pan.

19. An automatic oil additive injector for use in injecting a predetermined volume of additive into an engine oil filter assembly during periodic oil filter changes, said engine oil filter assembly having a removable filter, the injector comprising:

a filter header housing having an additive reservoir, a pumping bore communicating with said filter, and a passage interconnecting the reservoir and pumping bore;

a check valve mounted in said housing and disposed to permit additive flow from said reservoir to said pumping bore while preventing reverse flow;

pumping means disposed in said pumping bore including a pumping member having a portion disposed for engagement by said filter, a spring-biased check valve disposed to permit additive flow from said pumping bore to said filter while preventing reverse flow, a pumping member having a portion disposed for engagement by said filter, the valves and pumping member coacting to transfer said predetermined volume of said additive from said reservoir of the injector upon operation of said pumping member by the disengagement and engagement of said filter.

20. The injector of claim 19 and said injector reservoir having a volume of sufficient volume relative to said predetermined volume to provide additive at each oil filter change throughout a predetermined useful life of said engine.

* * * * *